3,621,732
FASTENING FOR MOTOR VEHICLE-SAFETY
STEERING COLUMNS
Herbert Kaniut, Cologne-Heimersdorf, Germany, assignor to Ford Motor Company, Dearborn, Mich.
Filed Feb. 27, 1970, Ser. No. 15,170
Claims priority, application Germany, Mar. 5, 1969, P 19 11 054.4
Int. Cl. B62d 1/18
U.S. Cl. 74—492                                    8 Claims

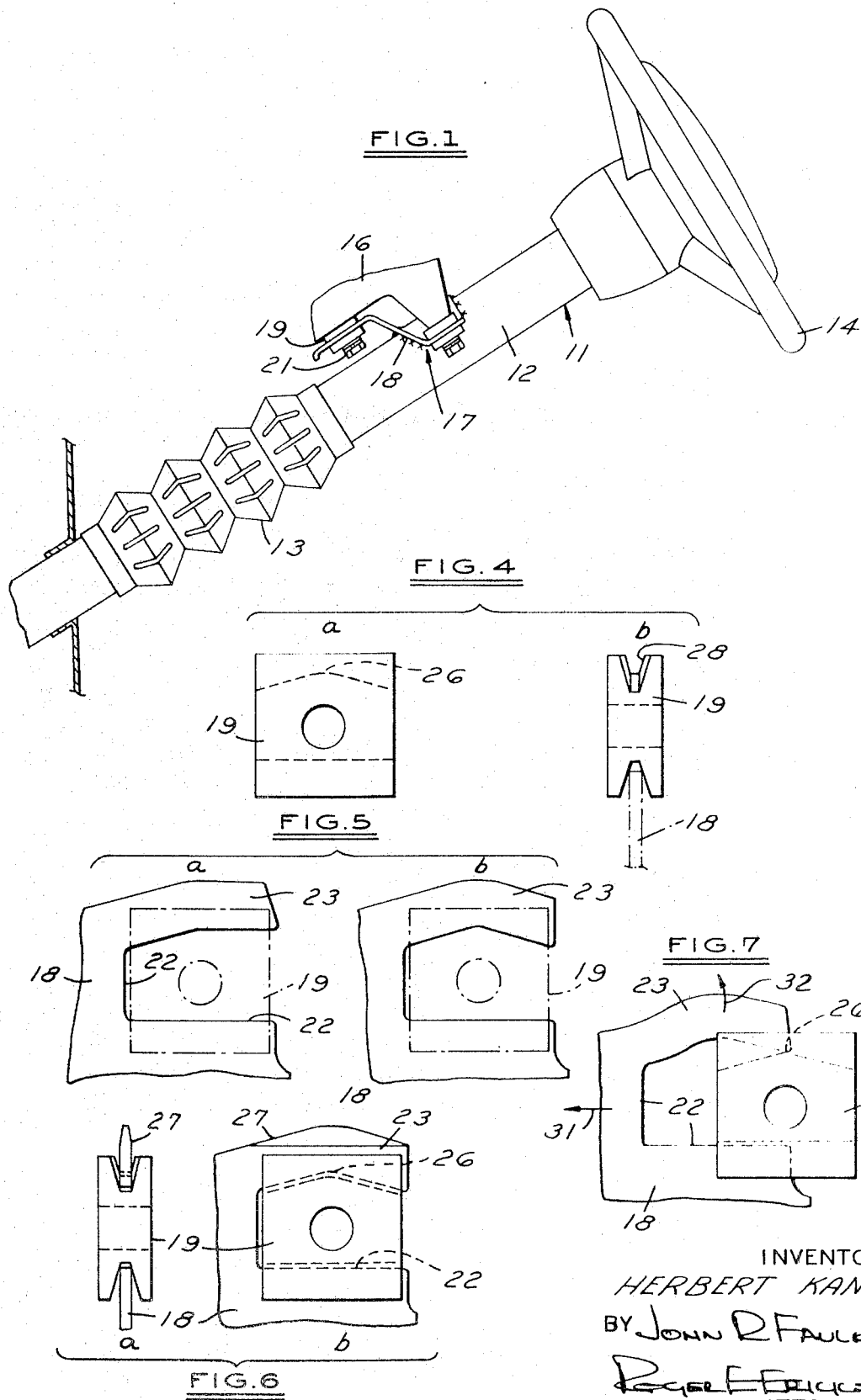

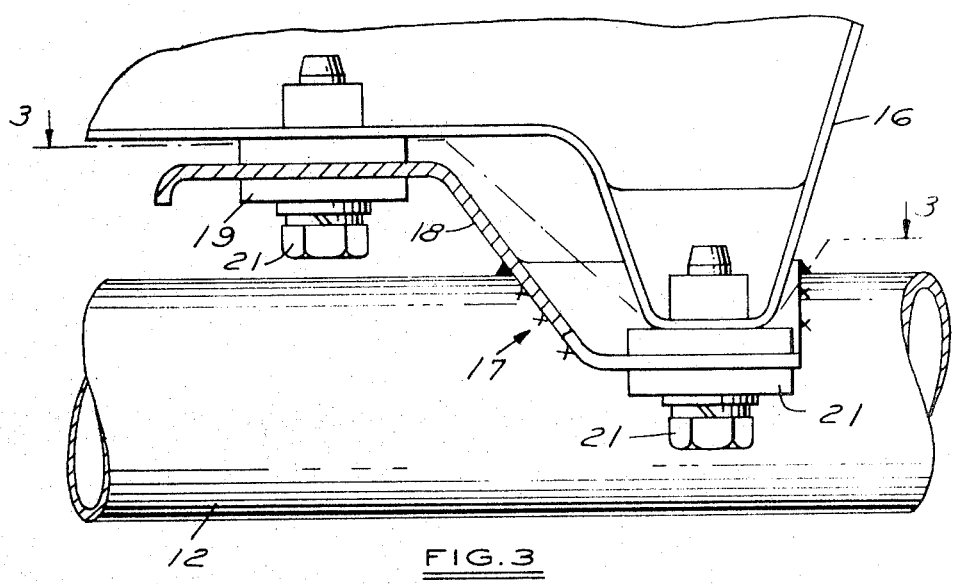
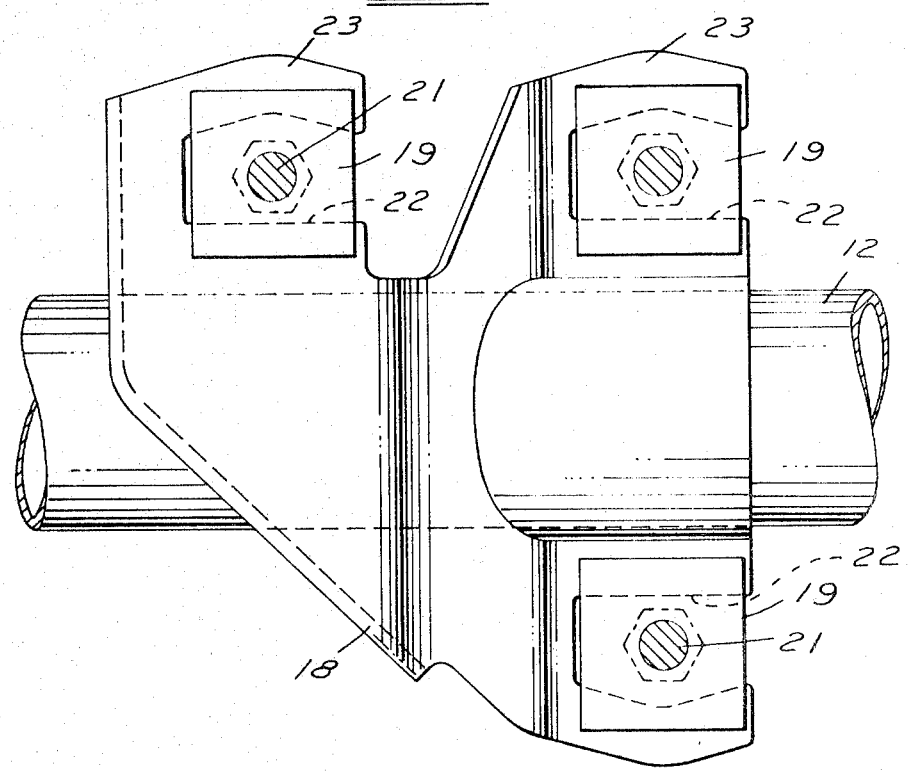

ABSTRACT OF THE DISCLOSURE

A releasable mounting means for an energy absorbing steering column that includes one or more sliding components received within a corresponding number of slots formed in a bracket. A portion of each slot is defined by a lug which partially encloses or grasps one of the sliding components and secures it to the bracket. The bracket is made of material sufficiently deformable to release the sliding components on application of a predetermined axial force to the upper end of the steering column.

BACKGROUND AND SUMMARY OF THE INVENTION

The present invention relates to a mounting means for a motor vehicle energy absorbing steering column, more particularly to a mounting means for securing the outer tube of the steering column to an under-cowl or under-dash support member so that the tube is released upon application of a force exceeding a predetermined magnitude.

This invention provides a collapsible energy absorbing steering column assembly and mounting means which is releasable by the bending or deforming of certain structural elements rather than the shearing thereof. This invention also provides a releasable steering column mounting means which is reliable in operation and economical to produce and install.

A steering column and support assembly constructed in accordance with this invention includes an energy absorbing collapsible steering column and support means for securing the steering column to the body of the motor vehicle. The support means includes a first member or bracket having a slot formed therein, a sliding component received within the slot and retaining means securing the sliding component within the slot and being releasable upon application of a predetermined force thereby permitting separation of the first member and the sliding component and further permitting controlled, energy-absorbing collapse of the steering column.

BRIEF DESCRIPTION OF THE DRAWINGS

FIG. 1 illustrates a side elevational view of a motor vehicle steering column and support structure in accordance with the invention.

FIG. 2 is an enlarged side elevational view of the bracket assembly 17, shown in FIG. 1.

FIG. 3 is a plan view of the bracket assembly 17, shown in FIG. 1.

FIGS. 4a and 4b illustrate a plan view and a side elevational view, respectively, of a sliding component 19, indicating the position of the mounting plate 18 relative thereto.

FIG. 5a is a plan view of the mounting plate 18 in relation to a slot 22 showing how the sliding component 19 is inserted prior to assembly.

FIG. 5b is the same as FIG. 5a, but showing the relationship of the parts following assembly.

FIGS. 6a and 6b illustrate a plan view and a side elevational view, respectively, of a sliding component 19 in accordance with the invention, showing the crimp or pitch zone used to produce preload in the lug 23 against the hump 26 of the sliding component.

FIG. 7 illustrates the manner in which the lug 23 bends or deforms when a predetermined load is produced upon the steering column assembly.

DETAILED DESCRIPTION OF A PREFERRED EMBODIMENT

FIG. 1 illustrates a steering column assembly 11 having at the lower portion of its outer tube 12 an energy dissipating deformable element 13. The steering column assembly 11, carrying the steering wheel 14, is secured at the upper portion of its outer tube to an under-dash or under-cowl support member 16 by means of a releasable bracket assembly 17 in accordance with this invention.

From FIGS. 2 and 3 it can be seen that the bracket asembly 17 consists of a mounting plate 18 fixed to the upper portion of the outer tube of the column 11 and of one or more sliding components 19 which are secured by threaded fasteners 21 to the support member 16 or to other parts of the motor vehicle body.

The mounting plate 18 has a plurality of parallel slots 22 having their open ends directed toward the steering wheel 14. A corresponding plurality of lugs 23 define a portion of the slots. The plate 18 is made of bendable or plastically deformable material, such as soft steel, so that the lugs 23 may be bent or deformed to retain sliding components 19 within the slots 22.

Each sliding component 19 has a pair of U-section grooves 28 running parallel to the axis of the steering column assembly, the lateral walls of which bear against the edges of the slots 22 in the mounting plate 18.

In order to compensate for manufacturing tolerances and to more firmly secure the sliding components 19 within the slots 22 of the mounting plate, the grooves 28 are given V-shaped or trapezoidal cross-sections so that the edges of the slots 22 of the mounting plate 18 bear not against the bases of the grooves 28 but against their oblique lateral walls.

After the insertion of the sliding components 19 at the time of the assembly (see FIG. 5a), the ends of each lug 23 are bent about the hump or bulge 26 on a respective sliding component as shown in FIG. 5b, thus securing the mounting plate 18 to the sliding components 19.

Because plastically deformable materials yield fractionally after a bending operation, if no other measure were adopted the sliding components 19 would not be firmly fixed within the slots 22 of the mounting plate 18. In order to assure that the connections are firmly secured, the bent lugs 23 (see FIGS. 6a and 6b) are plastically crimped or deformed in the region 27 in a direction transverse of their own general extent. This crimping provides a preload between the sliding components and the lugs of the mounting plate.

OPERATION

Application of a generally axial force in the forward direction to the steering wheel 14 causes the upper portion of the outer tube 12 of the steering column assembly 11 and the mounting plate 18 to be forced forwardly in the direction indicated by arrow 31 of FIG. 7. This movement of the mounting plate relative to the sliding components 19 causes the bent ends of the lugs 23 to be opened in the direction of the arrow 32, thereby releasing the support of column assembly 11 and permitting deformation of the energy absorbing element 13.

The force which has to be exerted upon the steering column 11 or steering wheel 14 in order to cause the bracket assembly 17 to release is precisely determinable and can be made a function of the thickness of the mounting plate 18, the width of the lugs 23 and the shape of the bulges or humps 26 on the sliding components 19.

As well as permitting release when a forwardly directed force acts upon the steering column, the bracket assembly 17 prevents release when the resultant force acting upon the steering column relative to the support member 16 is in a generally rearward direction. This action results because the slots 22 open only in the axial direction toward the steering wheel 14.

This description presents a preferred embodiment of the invention. Alterations and modifications may occur to those skilled in the art which are included within the scope of the following claims.

I claim:

1. A steering column assembly and its attendant support structure for mounting to the body of a motor vehicle including:
   a steering column assembly having an outer component provided with an energy absorbing, collapsible portion,
   support means connecting said outer component to said vehicle body, said support means including:
      a first member secured to said outer component having a plurality of slots formed therein, said slots being defined in part by a corresponding plurality of lugs,
      a plurality of elements having bulged surfaces adapted to be secured to said body and respectively received within said slots,
      said lugs engaging said bulged surfaces so as to retain said elements within said slots and to connect said first member to said body,
      said lugs being sufficiently bendable to release said bulged elements upon application of a predetermined axial force to the steering column.

2. A steering column and support structure according to claim 1 and including:
   said steering column having a steering wheel mounted on the upper end thereof,
   said slots extending in the axial direction of said steering column and opening toward said steering wheel.

3. A steering column assembly and support structure according to claim 2 and including: said plurality of elements having bulged surfaces being formed with grooves extending generally in an axial direction, said lugs received within said grooves, said bulged surfaces forming a portion of the base of said grooves.

4. A steering column and support structure according to claim 1 and including: said bulged surfaces protruding in a direction outwardly from the axis of said steering column.

5. A releasable support means for attaching an energy absorbing steering column to a vehicle body comprising:
   a bracket member constructed to be rigidly connected to one of said steering columns and said body,
   a second member constructed to be rigidly connected to the other of said steering column and said body,
   said bracket member having a deformable portion engaging and retaining said second member and constructed to release said second member when subject to a resultant force exceeding a predetermined minimum in a given direction.

6. A releasable support means for attaching an energy absorbing steering column to a vehicle body comprising:
   a bracket member having at least one slot formed therein, said bracket member including a retaining lug defining a portion of said slot,
   at least one component having a portion receivable within said slot,
   said lug engaging said just-mentioned portion so as to retain said just-mentioned portion within said slot and to connect said bracket member and said component,
   said lug being sufficiently deformable to release said component upon application of a predetermined force in the generally forward direction of the axis of the steering column.

7. A steering column and support assembly for mounting the steering column to the body of a motor vehicle comprising:
   an energy absorbing steering column and
   support means securing said steering column to said body including:
      a first member having a slot with an open end therein,
      a second member received within said slot,
      a portion of said first member at least partially enclosing said second member within said slot so that the open end of said slot is restricted relative to other dimensions of the slot,
      said portion of said first member being deformable to eliminate the restriction and to release said second member upon application of a predetermined force.

8. A steering column and support assembly for mounting the steering column to the body of a motor vehicle comprising:
   an energy absorbing steering column and
   support means securing said steering column to said body including:
      a first member having a slot formed therein,
      a second member received within said slot,
      retaining means securing said second member within said slot,
      said retaining means comprising a lug, being formed as a part of said first member and defining a portion of said slot,
      said lug securing and at least partially enclosing said second member within said slot,
      said lug being sufficiently deformable to release said second member upon application of a predetermined force in the forward direction of the axis of said steering column and to thereby permit separation of said first and second members of said one support means.

References Cited

UNITED STATES PATENTS 3,394,613  7/1968  Curtindale _____ 74—492
3,476,345  11/1969  Ristan _____ 74—492 X MILTON KAUFMAN, Primary Examiner U.S. Cl. X.R.

180—78, 82; 248—221, 230